June 13, 1944. W. E. KINGSTON 2,351,572
DIRECT-READING RECORDING DILATOMETER
Filed April 18, 1942 3 Sheets-Sheet 1
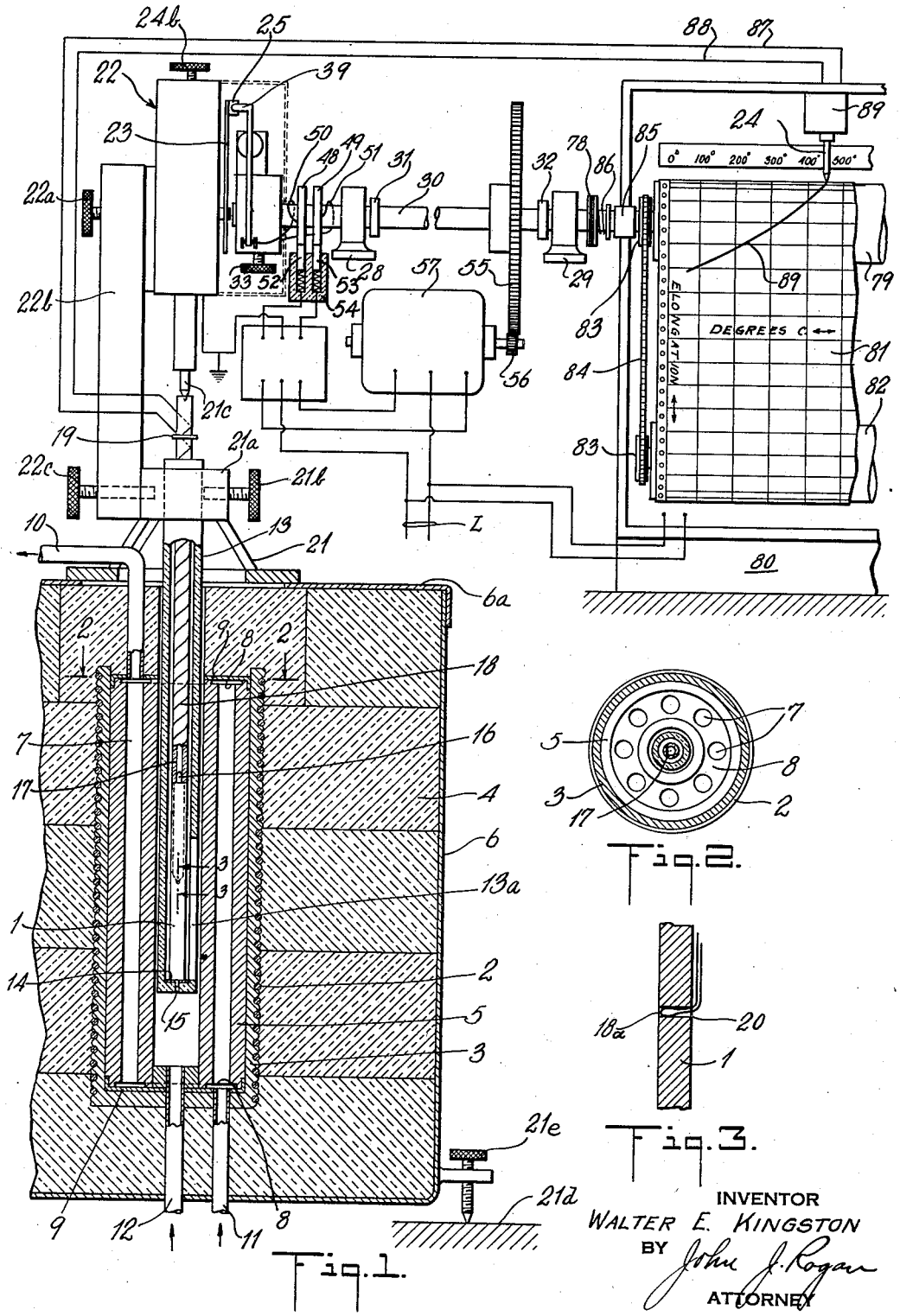
INVENTOR
WALTER E. KINGSTON
BY John J. Rogan
ATTORNEY June 13, 1944.  W. E. KINGSTON  2,351,572
DIRECT-READING RECORDING DILATOMETER
Filed April 18, 1942  3 Sheets-Sheet 2

INVENTOR
WALTER E. KINGSTON
BY
ATTORNEY

Patented June 13, 1944

2,351,572

UNITED STATES PATENT OFFICE 2,351,572

DIRECT-READING RECORDING DILATOMETER

Walter E. Kingston, Emporium, Pa., assignor to Sylvania Electric Products, Inc., a corporation of Massachusetts Application April 18, 1942, Serial No. 439,463

13 Claims. (Cl. 73—51)

This invention refers to recording instruments, and in particular to recorders in which one physical characteristic of a material or system is plotted as a function of another characteristic or physical property of the same system.

Recording instruments are known, in which the variations of a physical characteristic of a system with time are recorded by a mechanical scriber or a light ray, either on a disc-shaped recording sheet of paper, or light sensitive film, or on a sheet moved linearly by rotating drums, as recording watt-hour meters, current meters, pressure recorders, or thermometers.

A second type of recording instruments is known in which one physical characteristic of a system is recorded in terms of another physical characteristic. An example of this type is a recording oscillograph, in which, say, a current through an electrical network is recorded as a function of an applied voltage. Another example is a recording dilatometer, an instrument which automatically plots elongation of a standard shape test piece of a material as a function of temperature.

While it is comparatively simple to obtain a high degree of precision for the first type of recording meters, i. e., the type in which the variation of a characteristic is measured as a function of time, an intrinsic difficulty presents itself in most recording meters of the second type, in which the second variable is not the time but another characteristic of the system.

This is substantially due to the fact that it is easy to supply enough power for moving a recording sheet uniformly along a "time" coordinate, while it is generally not so simple to eliminate distortional effects, if another variable characteristic of a system is used for moving a recording sheet. It is obvious, that a direct mechanical drive obtained from the thermal elongation of a test piece consumes power. The forces exerted by the test piece over the small length of the path on which they act, i. e., the absolute length of the elongation, must be large in order to deliver the energy for driving the rotating drum of a recording meter. The reaction of the recording mechanism on the test piece will oppose its heat expansion. This is especially true when a large multiplication factor must be used as in a recording dilatometer, where a factor of as high as 1000:1 is used.

The reading obtained from a direct drive would thus not be a measure of the free thermal expansion of the test piece, but rather of the difference of the path of the end of a freely expanding test piece, and of the path into which its elastic force has to be multiplied for obtaining the power needed for driving the recorder. The precision of such a recorder will, therefore, change from material to material. It would be impossible to make any statement on the error of the reading, as this error depends entirely on the elastic properties of the test piece, which, in general, are not known.

One known construction of a recording dilatometer uses this direct drive, and its precision is therefore very low. Another known type uses and optical system, by which a light ray is deflected in two mutually perpendicular directions, one direction corresponding to the temperature, the other to the elongation. The deflected light ray is focused on a photographic film, and thus produces a photographic record on a stationary recording surface.

This instrument is very sensitive to vibrations, and needs expert supervision. In addition, the recording surface must be kept in a dark chamber. The record cannot be read before the photographic film or plate has gone through the process of developing, fixing, washing, and eventually, printing.

It is, therefore, a principal object of the present invention to provide an automatic recording dilatometer or similar measuring recorder, in which the reaction forces on the test piece are practically zero, and which may be read at any desired instant of measuring and recording.

Another object of the invention consists in providing a rugged recorder of extremely high precision, which is not sensitive to vibration and can be safely handled by any unskilled operator.

A feature of the invention refers to a sensitive recorder employing a torque amplifier which delivers output power substantially without any consumption of input power.

One feature of the invention refers to a bi-directional rotating spring contact, whose instantaneous angular position is determined by the position of a hand freely movable clockwise as well as counterclockwise.

Another feature of the invention refers to a recorder provided with a reversible, dynamically braked motor, which delivers the power for moving the spring contact and the driving mechanism of the recorder into the position prescribed by the freely movable hand.

It is a further object of the invention, to replace the constant rotation of a recording drum in a recorder, such as an expansion recorder, by an intermittent motion in any desired direction and by an amount proportional to the expansion of a test piece, the drum motion following substantially simultaneously the free expansion or contraction of the test piece.

A feature of the invention refers to an expansion recorder involving the use of a dial micrometer gauge in connection with a double action rotating spring contact.

Another object of the invention is to provide a dilatometer which insures the correct rate of heating and of cooling of the test piece.

A still further object is to provide an automatic recording dilatometer which is suitable for use with materials of widely different characteristics, e. g., metals, glass, ceramics, etc.

A feature of the invention refers to method of cooling the test specimen at a desired rate, by a cooling liquid or gas.

In the drawings which represents one preferred embodiment,

Fig. 1 is a composite structural-schematic diagram of a dilatometer embodying the invention.

Fig. 3 is a sectional view of Fig. 1 along line 3—3 thereof.

Fig. 7 is a detail diagram of the control relay circuits.

The recording dilatometer according to my invention, records directly on a paper chart, elongation as a function of temperature. The chart paper is linear, the record is in ink. The expansivity working range, and therefore the sensitivity, may be varied at will. The working range may be chosen to suit the conditions of use. Thus a length on the recording chart of 15" may correspond to the expansion in a 4" specimen of .025", and a width of the recording chart of 12" may correspond to a range of 0–700° centigrade. Thus on this instrument a record is drawn which is identical to the record calculated from an infinite number of dilatation and corresponding temperature readings on the dial gauge of a concentric quartz tube dilatometer. There is no attention required other than inserting the specimen in the dilatometer and starting up the equipment. At the end of a standard 8-hour run (e. g., 4 hours heating and 4 hours cooling) the equipment is shut off. No attention is needed during this period. At the completion of the test the chart is torn off and constitutes a complete record of the expansion of the specimen.

Figure 2:
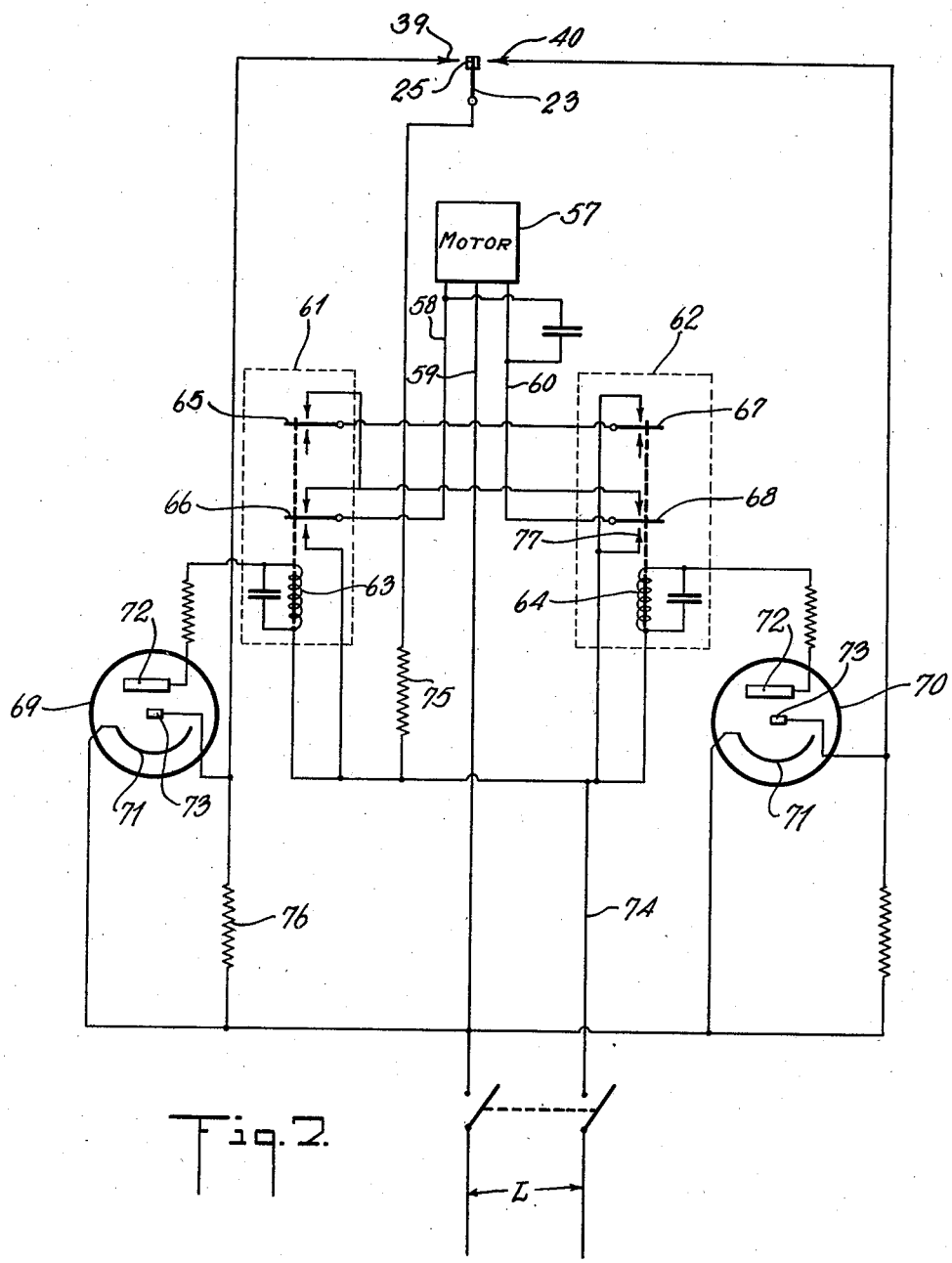
Fig. 2 is a sectional view of Fig. 1 along line 2—2 thereof.

Referring to the drawings, the specimen 1 to be tested is preferably in the form of an elongated rod which is adapted to be heated and cooled at a predetermined rate. For this purpose, the heating is effected by an electrically wound furnace, the heating coil 2 of which is wound around a closed bottom alundum tube 3 approximately 8" in length which is surrounded or enclosed by a heat insulating jacket 4. The exterior of tube 3 is helically grooved to receive the tightly wound heating coil 2. The tube 3 may have an external diameter of 2⅛" and telescoped therein is a copper jacket 5 of approximately 2" outside diameter and approximately ⅝" of inside diameter. The jacket 5 is approximately the same length as the alundum tube 3. By spreading the individual helical turns of the heating coil at the middle and bottom section of tube 3, it is possible to proportion the heat input into the tube so that the temperature along the inside of the jacket 5 is very nearly uniform. If desired, the other insulating jacket 4 is provided with a stainless steel furnace shell 6. The copper jacket 5 as shown in Fig. 2, has eight ¼" holes 7 extending throughout its entire length, the holes being located midway between the inner and outer walls of the jacket 5 and equally spaced around the circumference thereof. These holes are all connected in parallel by cutting a circular groove 8 in each end of the copper block, these grooves acting as headers for all the holes 7. Over each end of the copper block 5 is fastened a stainless steel head 9, the upper head 9 having the outlet pipe 10 and the bottom head 9 having the inlet pipe 11. Pressed into the bottom of the copper block is an atmosphere inlet pipe 12 whereby any desired atmosphere may be admitted in order to control the atmospheric conditions around the specimen 1. Jacket 5 because of its relatively great mass, acts as a heat reservoir and provides the desired temperature inertia to the heating system, thus maintaining a very uniform temperature around the specimen 1. The purpose of circulating liquid through holes 7, is to provide controlled cooling and controlled heating of the specimen. This is usually required because of the very slow natural cooling of the well insulated furnace especially as it is approaching room temperature. The cooling rate is controlled by pumping cold liquid (at room temperature) or gas such as hydrogen through the system.

For the purpose of supporting the specimen within the furnace, a concentric quartz tube unit is employed comprising a hollow quartz tube 13 which telescopically receives the round quartz rod 17. Tube 13 is approximately ½" outside diameter and ⅜" inside diameter, and the bottom inside face of tube 13 is perfectly flat which may be accomplished by melting in a thin quartz disc 14, the face of which has been previously ground flat. The bottom of tube 13 has a small central perforation of .060" diameter to act as a passage for the atmosphere and to receive a small central tip 15 of .050" diameter on the lower end of specimen 1. The upper end of the specimen also has a small central tip 16. If the specimen is 4" long and approximately ¼" diameter, the side of tube 13 has at its lower end a slit or window 13a approximately 3" long to allow convenient insertion of the specimen into the tube. If the specimen is of metal whose individual crystals undergo allotropic transformations which give a very accurate indication of the exact temperature at which transformation begins, each end of the specimen is ground flat around the tips 15 and 16. In the case of glass specimens or other amorphous materials in which there are no distinct crystallographic transformations, there is no advantage in grinding the ends flat. In the case of glass specimens, each end may be drawn down to pointed form.

The member 17 is of tubular quartz approximately ¼" outside diameter with a central .060" bore and approximately 3" shorter than tube 13. It is spaced from the inner wall of tube 13 by a series of integral beads (not shown) formed from small drops of quartz fused on its outer face. These beads are disposed 120° apart around the rod and are of such a size that the rod plus the beads can slide easily in the tube 13 without constriction and without undue looseness. A thermocouple 18 is wound helically around rod 17 and is held in place at its emerging top end by a rubber band 19 wound tightly around the rod and the thermocouple wires. The hot junction 18ª of the thermocouple is threaded into a small hole 20 approximately .030" drilled through the cross section of specimen 1 midway between its ends. The thermocouple wires then run parallel to the longitudinal axis of the specimen 1 without touching it, and then they are wound helically around member 17 as mentioned. The helical winding of the thermocouple allows movement of the specimen without restriction.

The quartz tube assembly is inserted into the furnace which is supported by leveling screws 21ᵉ on table 21ᵈ. For the purpose of centrally supporting the quartz tube assembly in the furnace, there is attached to the top cover 6ª a metal spider 21 which terminates at its upper end in an annular hub 21ª. The quartz tube assembly is maintained in its central position by means of the thumb screw 21ᵇ threaded through the hub 21ª. The dilatometer control unit 22 may be of known construction comprising a vertically movable spring-pressed pin 21ᶜ which engages the quartz member 17. Pin 21ᶜ is coupled through suitable gearing or the like (not shown) to cause rotation of the indicator pointer 23. One full revolution of pointer 23 may correspond for example to an expansion of .010" in the specimen. At the same time that the expansion is being indicated by pointer 23, the temperature of the specimen causes the movement of the recording arm 24 of any well-known automatic temperature recorder such for example as a Brown automatic potentiometer pyrometer recorder controller sold by the Brown Instrument Company.

Figure 4:
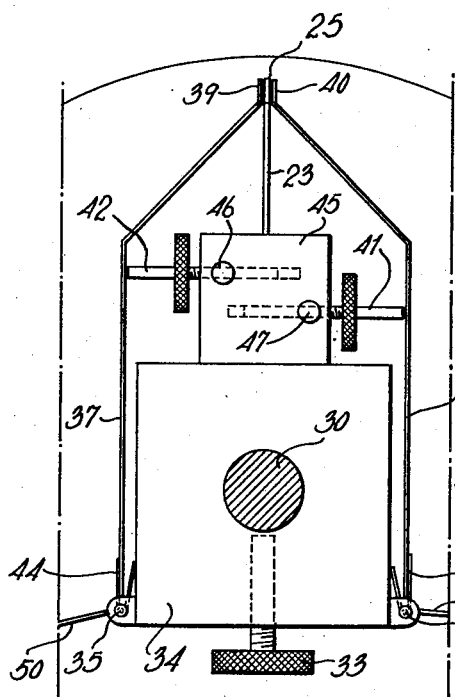
Fig. 4 is an enlarged detailed view of part of the contact control mechanism of Fig. 1.
Figure 5:
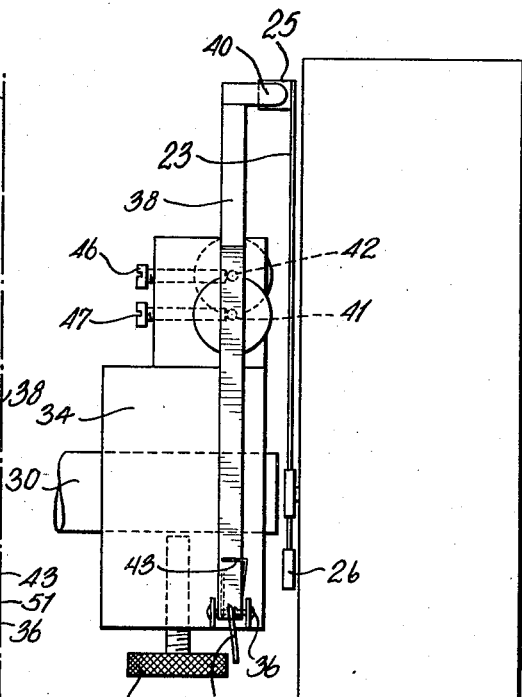
Fig. 5 is a side view of the mechanism of Fig. 3.

The device 22 may be a standard "Starrett" dial indicator of a range from 0-.010" per revolution and an overall range of 0-.200". The gauge has jewelled bearings and has a setting device 24ᵇ by which the zero or starting point may be adjusted. To use such a gauge according to my invention, the cover glass and outside scale are removed, leaving the pointer 23 and the inside blank scale exposed. The pointer is replaced by one having a light platinum contact 25 soldered to the extreme end as shown in Figs. 4 and 5. In order to prevent unbalance, the pointer is carefully counter-weighted by weight 26 before attachment to the dial gauge, as is well-known in the instrument art.

Device 22 is fastened by thumb screw 22ª to a bar 22ᵇ which in turn is fastened by thumb screw 22ᶜ to the hub 21ª. Thus, the pin 21ᶜ is maintained central with member 17 and so that equal pressure is exerted by the said pin on specimens of the same length.

Rigidly supported from table 21ᵈ are bearing brackets 28, 29, in which is supported a shaft 30 carrying collars 31, 32, for preventing longitudinal movement of the shaft. Rigidly attached to the left-hand end of shaft 30 (Figs. 4 and 5) by thumb screw 33, is an insulation block 34. Pivotally attached to block 34 at points 35, 36, are two spring contact arms 37, 38 of material such as phosphor-bronze each carrying a platinum contact point 39, 40, at its upper end the contact points extending substantially perpendicular to the pointer 23. The contacts 39 and 40 are located in slightly spaced lateral alignment with contact 25, and contact arms 37, 38, are held lightly against the adjusting screws 41, 42, by springs 43, 44. Hence the swinging of the contact arms properly sets the mechanism at the beginning of a test run wtihout putting a mechanical strain on the very delicate pointer 23. Likewise, if during the test for any reason the mechanical linkage should fail to follow the pointer, no undue strain will be placed on the pointer. Under normal operating conditions, contacts 39 and 40 would not move appreciably relative to each other. The screws 41, 42, are threaded into an insulating block 45 fastened to block 34 and are fastened in adjusted position by respective set screws 46, 47. By means of screws 41, 42, the minimum contact clearance between contacts 39, 25, 40, can be adjusted.

Preferably, the screws 41, 42, should be adjusted so that when contact 25 is centered between 39 and 40, a clearance of approximately .005" exists between 25 and each of the contacts 39, 40. Since .0001" expansion of the specimen represents about 1/10" movement of contact 25, it can be seen that a very small distance of contact travel and hence a corresponding very small change in length of the specimen e. g., of the order of .000005" or less will cause contact 25 to make with either of the contacts 39, 40, depending upon whether it is a contraction or an expansion of the specimen.

Figure 6:
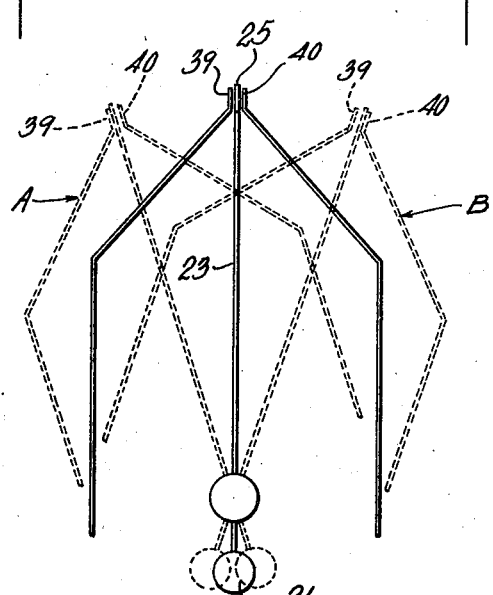
Fig. 6 is a diagram explanatory of Figs. 4 and 5.

Fig. 6 shows the contacts in three different positions. The full line position is normal wherein contact 25 is centrally spaced from 39 and 40. In position A corresponding to a contraction of the specimen, contact 25 makes with contact 39. In position B corresponding to expansion of the specimen, contact 25 makes with contact 40. It will be observed (Fig. 5) that contacts 39 and 40 terminate short of the pointer 23 but considerably overlap the contact 25.

Insulatedly fastened to shaft 30 adjacent the block 34 are slip rings 48, 49, which are connected by flexible conductors 50, 51, to contacts 39 and 40. Conductors 50, 51, are helically coiled around shaft 30 and are soldered to clips attached to pivots 35, 36. The spring-pressed brushes 52, 53, cooperating with slip rings 48, 49, are mounted in an insulator block 54 suitably supported from table 21ᵈ. Also fastened to shaft 30 is a large gear 55 which meshes with a small gear 56, the gear ratio being approximately 10 to 1 and with a minimum of lost motion between gears.

Gear 56 is fastened to the shaft of a small dynamically braked reversible motor 57 which is capable of rotating gear 56 at speeds as low as ½ R. P. M. The motor is driven in one direction or the other under control of a switching arrangement as shown in detail in Fig. 7.

With the type of motor above mentioned, it is possible to stop the armature in as little as ½ a revolution without further coasting, and since the normal speed of the motor armature may be 1800 R. P. M., which is in turn geared down to ½ R. P. M., and since the motor rotor can move 180° at a time if necessary, it is possible for the shaft 30 to follow substantially instantaneously, minute variations of the position of pointer 23.

Referring to Fig. 7, the motor 57 is supplied with power from the supply line L preferably through an insulating transformer (not shown) if contact 25 is grounded. The motor is provided with three feed wires 58, 59, 60, and with appropriate motor control windings well-known in the motor art, so that when power is supplied to wires 58 and 59, the motor rotates in one direction, and when power is applied to wires 59 and

60, the motor rotates in the opposite direction. The wires 58 and 60 are selectively switched into circuit under control of two electromagnetic relay switches 61, 62, whose respective operating windings 63, 64, control respective sets of armatures 65, 66 and 67, 68. The switches 61, 62, are selectively controlled by respective gas triode tubes 69, 70, which may be of the 0A4G type, each having a cathode 71, main anode 72 and a starter anode 73. When the contact 25 is out of engagement with contacts 39 and 40, neither of the tubes 69, 70, is conductive. Should the sample 1 expand, causing closure of contacts 25 and 40, the starter anode 73 of tube 70 receives sufficient positive potential to produce a discharge between electrode 71 and 72 from line L over conductor 74, resistor 75, contact 25, contact 40, starter anode 73, and resistor 76. Tube 70 becoming conductive closes a circuit from conductor 74 through relay winding 64 from electrode 72 to 71 back to the line L. Relay 62 thereupon closes a circuit from conductor 74, contact 77, armature 68, conductor 60 through one of the motor control windings, conductor 59 back to the line. This circuit remains closed and contacts 39 and 40 are rotated until contact 40 just disengages contact 25 whereupon tube 70 ceases to pass plate current and relay 64 is deenergized to open the motor circuit. Should the sample 1 contract a circuit is closed between contacts 25 and 39, thereupon tube 69 becomes conductive and causes the energization of relay 63 and the closure of the motor control circuit over wires 58 and 59, to cause the motor to rotate in the opposite direction. When contact 39 just disengages contact 25, the motor circuit is broken.

Shaft 30 is also connected through a slip-friction clutch or other positively acting clutch 78 to one of the chart moving drums 79 of the automatic potentiometer recorder 80. In accordance with the invention, the chart 81, instead of being advanced in one direction at a fixed rate, is arranged to be moved in either direction and at variable rate under control of motor 57 and contacts 25, 39, 40, and in proportion to the expansion or contraction of the specimen. In order that the chart may be properly moved in either direction, the reroll drum 82 is positively coupled to drum 79 by a sprocket and chain drive 83, 84, so that both drums move the chart at approximately the same linear speed in either direction. Preferably, the shaft of drum 79 is coupled to shaft 30 through any well-known form of flexible or spring coupling 85 or universal joints. By means of clutch 78 which may consist of two discs each covered with an abrasive material such as rough leather normally held in engagement by tension spring 86, the clutch can be decoupled so that the chart 81 can be manually advanced or retarded independently of pointer 23 for adjustment purposes. The chart 81 may be provided in the direction of its length with a series of parallel lines corresponding to units of temperature, and if desired it can be marked along one or both edges with graduated marks representing units of expansion.

The cold junction wires 87, 88, from the thermocouple, are connected to the recording mechanism 89 of the automatic potentiometer whereby the recording stylus or pen 24 is moved to mark chart 81 at the proper temperature. Consequently, there will be traced on chart 81 a curve 89 of which the ordinates represent change of length of the specimen 1 and the abscissae represent temperature of the specimen, thus giving a direct reading two-variable graph of the elongation-temperature characteristics of the specimen.

It will be understood that the heating and cooling of the specimen is preferably achieved automatically under control of any well-known automatic furnace control. Thus the current to furnace winding 2 can be varied by any well-known heating-cycle controller whereby the value of the current applied to said winding is varied over a predetermined time according to a definite law, which law may be varied by using different cycle-control templates as is well-known in the automatic furnace control art. Thus in the case of a four-hour heating period, the automatic pyrometer control for the furnace, acts in conjunction with the template control to cause the temperature of the specimen to be increased in uniform increments from 25 to 600° C. or other temperature range followed by a four-hour cooling at a uniform rate down to 25° C. In order to obtain uniform cooling at any desired rate, water or other cooling fluid is pumped through the metal jacket 5, the amount of fluid or gas pumped through the jacket being regulated by the furnace temperature controller through a valve mechanism during the cooling period.

If the apparatus is so arranged that one revolution of the dial 23 equals .010" expansion or contraction, then the chart 73 can be moved the desired distance to give the required fineness of reading, for example it may be moved a distance of 6.4" to correspond to an expansion of .010" of the specimen. The length of the chart that will be used for producing the graph may of course be correlated with the type of specimen being tested. For example with one type of alloy specimen, the normal expansion between 25 and 600° C. would record over a chart length of approximately 16". In the case of other specimens having different expansions, such movement of the chart may be too great or too less. In that case, the pointer 23 can be made to correspond to .020" expansion per revolution, or reduction gearing can be placed between the shaft 30 and the drum 79 in order to decrease the sensitivity to the desired value. It is also possible by using a definite gear ratio between shaft 30 and drum 79 to secure a chart speed in which the standard time divisions represent definite whole units of expansion. This of course would presuppose a test specimen of exactly the same length for each test and would give a final expansion-temperature graph which could be easily read and would require no calculation of expansivity values.

The manner of using the equipment is as follows. First the properly prepared specimen 1 is inserted into the quartz tube 13 and the thermocouple 18 is secured in place. The quartz tube unit is then inserted into the furnace and the tension on the specimen through pin 21c is adjusted to a standard value by setting the starting point of the pointer 23 always at the same reading. During this adjustment, the contact arms 37, 38, have been moved out of the way and are then restored to their normal position with respect to the pointer as represented by the full-line position (Fig. 6). The clearance between the contacts 25, 39 and 40 should not exceed .005" on either side of contact 25. The set screw 33 is then tightened. The chart 81 is set either by uncoupling the clutch 78 or by holding the shaft 30 so that the starting point of the graph to be recorded is on a main reference division of the chart. The proper cycle template having been put on the cycle controller of the furnace the power is turned on from the power supply lines L and the equipment started in operation. As the specimen is heated and expands, the pointer 23 turns slowly in a clockwise direction (Fig. 6) until contact 25 makes with contact 40. This initial movement of the pointer 23 to make the contact corresponds to an expansion of .000005" or less in the specimen. As soon as contacts 25 and 40 close, the relay winding 64 (Fig. 7) is energized and closes the circuit of the motor 57 causing the latter to drive the follow-up contact assembly clockwise until contacts 25 and 40 break. Since there is practically no inertia to the contact system, there is no overswing. The result is that the contact mechanism through a series of infinitesmal steps, follows the point 23 and in so doing causes the chart 81 to move in the desired direction to indicate expansion. All of the power required to do this work is supplied by motor 57 and there is substantially no load on the pointer 23.

Upon contraction of the specimen, the reverse takes place. The pointer 23 moves counterclockwise to make with contact 39 whereupon relay winding 63 is energized and causes the motor 57 to turn in the opposite direction thus moving the chart 81 in the opposite direction to correspond to contraction. With this equipment therefor, the contact mechanism is free to follow the pointer 23 regardless of the speed of rotation or number of revolutions of the pointer and without loading the pointer or impairing the accuracy of the indicator. Preferably of course, the motor speed must be chosen so that it will exceed the speed of the pointer rotation corresponding to the greatest speed of expansion of the specimen. The accuracy of such a mechanism is within $100\% \pm 1.0\%$ as compared with a $100\% \pm 12\%$ average error of a "Leitz" type photographic recording dilatometer and as compared with a $100\% \pm 3\%$ average error for optical photographic type dilatometers such as described in Bureau of Standards Research paper RP722 dated October 1934.

It will be understood of course, that various changes and modifications may be made in the particular embodiments disclosed without departing from the spirit and scope of the invention.

For instance, the contact points 39 and 40 may be replaced by small induction coils or condenser plates and platinum contact 25 can be replaced by a small metallic vane, and utilizing a high frequency relay circuit. By this method the inductance or capacity of the circuit may be varied by movement of the metallic vane 25 affixed to the gauge pointer 23, and the follow-up mechanism actuated by the reversible motor 57 without any mechanical contact of the dial pointer and the follow-up mechanism.

What I claim is:

1. A direct-reading temperature-expansion recording system comprising a rotatable expansion indicator pointer carrying an electrical contact member rotatable in one direction under control of the expansion of a specimen and in another direction under control of the contraction of the specimen, a pair of rotatable follow-up contacts associated with said member, an automatic temperature-elongation recorder having a chart longitudinally movable in proportion to the degree of movement of said member and in a direction controlled by said follow-up contacts, and a single motor for moving said follow-up contacts and also for moving said chart to produce on said chart a single graph having temperature and elongation coordinates.

2. An automatic temperature-elongation recording system comprising a longitudinally movable recording chart, a reversible electric motor for moving said chart in opposite directions, a reversing relay arrangement for determining the direction of rotation of said motor, a rotatable expansion indicator pointer carrying contact and rotated by the specimen under test and rotated in proportion to the expansion of said specimen, a pair of rotatable spaced follow-up contacts located on opposite sides of said pointer contact and controlling the selective operation of said relay arrangement without placing any appreciable load on said pointer contact, a motor for rotating said pair of contacts as a unit in either direction according to the direction of movement of said pointer contact and in response to the extent of movement of said pointer contact, said motor also being connected to move said chart until said pointer contact and said pair of contacts assume relative positions wherein no electrical circuit is closed to either of said pair of rotatable contacts, and a recording pointer for producing on said chart a single graph having temperature and elongation coordinates.

3. An automatic recording system according to claim 2 in which said motor is of the dynamically braked type and is capable of rotating its armature at speeds as low as ½ R. P. M. with negligible overrunning.

4. A direct-reading automatic temperature-expansion recording system for producing a single graph record in the form of two coordinate variables, one representing for example temperature and the other representing for example expansion of a specimen under test, said machine comprising a movable contact or electrode which is operated mechanically by the expansion of the specimen, a reversible motor which is electrically controlled by said pointer to rotate in opposite directions and to an extent determined by the direction and amplitude of the contact movement, an automatic recording mechanism including a longitudinally movable recording chart, a pair of rollers for supporting said chart, said rollers being positively coupled for rotation as a unit whereby said chart can be moved longitudinally in either direction, a driving connection between said motor and said rollers, and a recording pointer for producing on said chart a single graph having temperature and elongation coordinates.

5. A direct-reading automatic temperature-elongation recording system for producing a single graph in the form of two coordinate variables related respectively to temperature and expansion of a specimen under test, an electrical contact which is mechanically rotated by the expansion of the specimen, means to repeat the movement of said contact to an automatic recorder comprising a driving shaft for the recording web of said recorder, a reversible motor for driving said shaft, a pair of closely spaced follow-up contacts insulatingly connected to said shaft and between which said electrical contact is positioned but normally spaced therefrom, control circuits for said motor which are normally open at said contacts when the instantaneous position of said chart corresponds to the expansion of said specimen and closed when said expansion changes to move said chart in proportion to the change of expansion, and a temperature recording arm for marking said chart with a single graph having temperature and elongation coordinates.

6. A direct-reading system according to claim 5 in which said control circuits include an electromagnetic relay switching arrangement connected to the directional control windings of said motor.

7. A direct-reading system according to claim 5 in which said control circuits include a reversible contact relay for controlling the directional control windings of said motor.

8. A direct-reading system according to claim 5 in which said control circuits include a pair of grid-controlled electron tubes each adapted to be rendered conductive by a corresponding one of said closely spaced contacts, and electromagnetic relay switches controlled by said tubes.

9. A direct-reading system according to claim 5 in which said controlled circuits include a pair of slip rings carried by said shaft and connected to said pair of closely spaced contacts, a pair of brushes for said slip rings, a relay switch arrangement connected to said brushes, and connections from said switch arrangement to a directional control winding of said motor.

10. A direct-reading recording system according to claim 5 in which said motor is geared to said shaft through a reduction gearing whereby said pair of closely spaced contacts follow said electrical contact substantially instantaneously and at substantially the same speed.

11. A direct-reading recording system according to claim 5 in which said shaft is connected to said recording web through a slip-friction clutch.

12. In a direct-reading temperature-expansion recording system, a main frame, an electric heating furnace to receive a specimen under test, an expansion-indicator pointer carried by said frame with its mechanical operating element in alignment with the specimen in the furnace for operation thereby, a rotatable shaft in substantial axial alignment with the axis of said pointer but mechanically independent thereof, a pair of follow-up contacts insulatingly carried by said shaft, means to adjust said follow-up contacts on said shaft with respect to said pointer so that normally said pointer is midway between said contacts, a reversible dynamically braked motor geared to said shaft, a relay arrangement for controlling the direction of rotation of said motor under control of said contacts, an automatic recording mechanism of the longitudinally moving record web type having means to support the recording web for movement in opposite directions under control of said motor, and a temperature-controlled marking member responsive to the temperature of the specimen for tracing a double variable graph on said chart.

13. A system according to claim 12 in which the furnace is provided with an automatic control arrangement whereby the rate of heating and the rate of cooling of the specimen can be made to follow a predetermined law.

WALTER E. KINGSTON.